(12) United States Patent
Hu et al.

(10) Patent No.: US 12,609,605 B2
(45) Date of Patent: Apr. 21, 2026

(54) ACTIVE PRE-CHARGE CIRCUIT

(71) Applicant: Rockwell Automation Technologies, Inc., Mayfield Heights, OH (US)

(72) Inventors: Jiangang Hu, Mequon, WI (US); Zhituo Ni, Hamilton (CA)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 248 days.

(21) Appl. No.: 18/486,473

(22) Filed: Oct. 13, 2023

(65) Prior Publication Data

US 2025/0125705 A1     Apr. 17, 2025

(51) Int. Cl.
*H02M 1/36* (2007.01)
*H02M 1/00* (2006.01)
*H02M 3/156* (2006.01)

(52) U.S. Cl.
CPC .......... *H02M 1/36* (2013.01); *H02M 1/0006* (2021.05); *H02M 3/156* (2013.01)

(58) Field of Classification Search
CPC ....... H02M 1/36; H02M 3/156; H02M 1/0006
See application file for complete search history.

(56) References Cited

U.S. PATENT DOCUMENTS

| | | | |
|---|---|---|---|
| 7,633,771 B2 | 12/2009 | Sack | |
| 8,339,084 B2 | 12/2012 | Welchko | |
| 10,054,646 B2 | 8/2018 | Jouper | |
| 10,340,802 B1 * | 7/2019 | Ke | H02M 1/34 |
| 11,114,842 B1 | 9/2021 | Zhang et al. | |
| 2015/0084404 A1 * | 3/2015 | Hashim | B60L 50/50 307/131 |
| 2023/0179096 A1 * | 6/2023 | Boeke | H02M 1/32 307/82 |
| 2024/0048062 A1 * | 2/2024 | Huang | H02M 1/0051 |

FOREIGN PATENT DOCUMENTS

| | | |
|---|---|---|
| CN | 104868757 B | 5/2017 |
| CN | 111239642 A | 6/2020 |
| EP | 3007293 A1 | 4/2016 |

OTHER PUBLICATIONS

Texas Instruments, "High-Voltage Solid-State Relay Active Precharge Reference Design," Design Guide: TIDA-050063, Document No. TIDUF21A, Dec. 2022 (Revised Jan. 2023), 20 pages.
Notice of Allowance issued by the United States Patent and Trademark Office in U.S. Appl. No. 18/545,498 on Sep. 2, 2025, 9 pages.

* cited by examiner

*Primary Examiner* — Alex Torres-Rivera

(57) ABSTRACT

A circuit includes a transistor configured to control precharging a charge storage device, and a diode coupled in parallel with the transistor. It also includes a shunt resistor coupled between the source of the transistor and a positive end of the charge storage device, an inductor coupled between the shunt resistor and the positive end of the charge storage device, and a current controller coupled to a gate of the transistor. The current controller is configured to receive a current measurement indicating an amount of current flowing through the transistor, process the current measurement to determine a switching duty cycle for the transistor, and to provide a signal to the gate of the transistor, the signal oscillating at the switching duty cycle. It also includes a power supply coupled with the source of the transistor and the drain of the transistor and configured to supply power to the current controller.

20 Claims, 8 Drawing Sheets

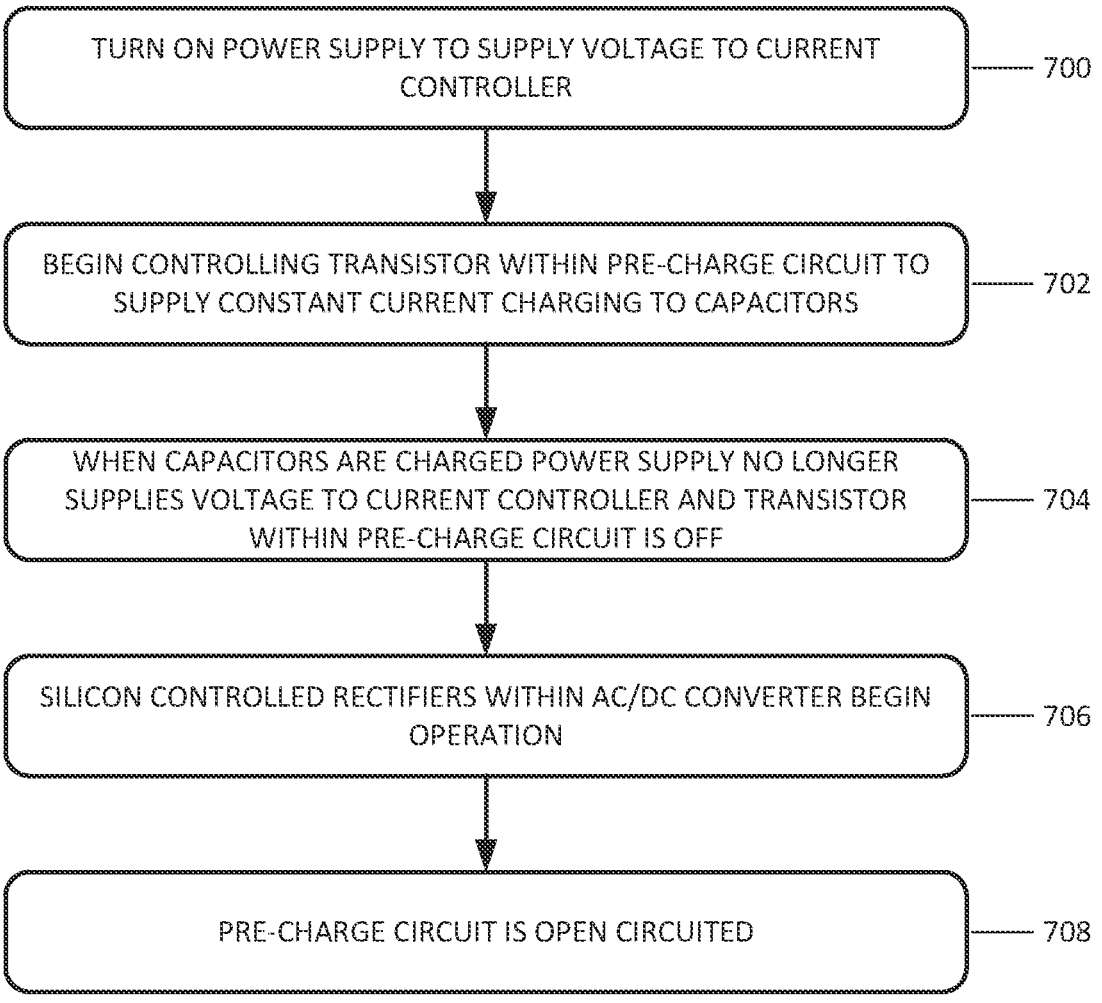

TURN ON POWER SUPPLY TO SUPPLY VOLTAGE TO CURRENT CONTROLLER — 700

BEGIN CONTROLLING TRANSISTOR WITHIN PRE-CHARGE CIRCUIT TO SUPPLY CONSTANT CURRENT CHARGING TO CAPACITORS — 702

WHEN CAPACITORS ARE CHARGED POWER SUPPLY NO LONGER SUPPLIES VOLTAGE TO CURRENT CONTROLLER AND TRANSISTOR WITHIN PRE-CHARGE CIRCUIT IS OFF — 704

SILICON CONTROLLED RECTIFIERS WITHIN AC/DC CONVERTER BEGIN OPERATION — 706

PRE-CHARGE CIRCUIT IS OPEN CIRCUITED — 708

FIG. 7

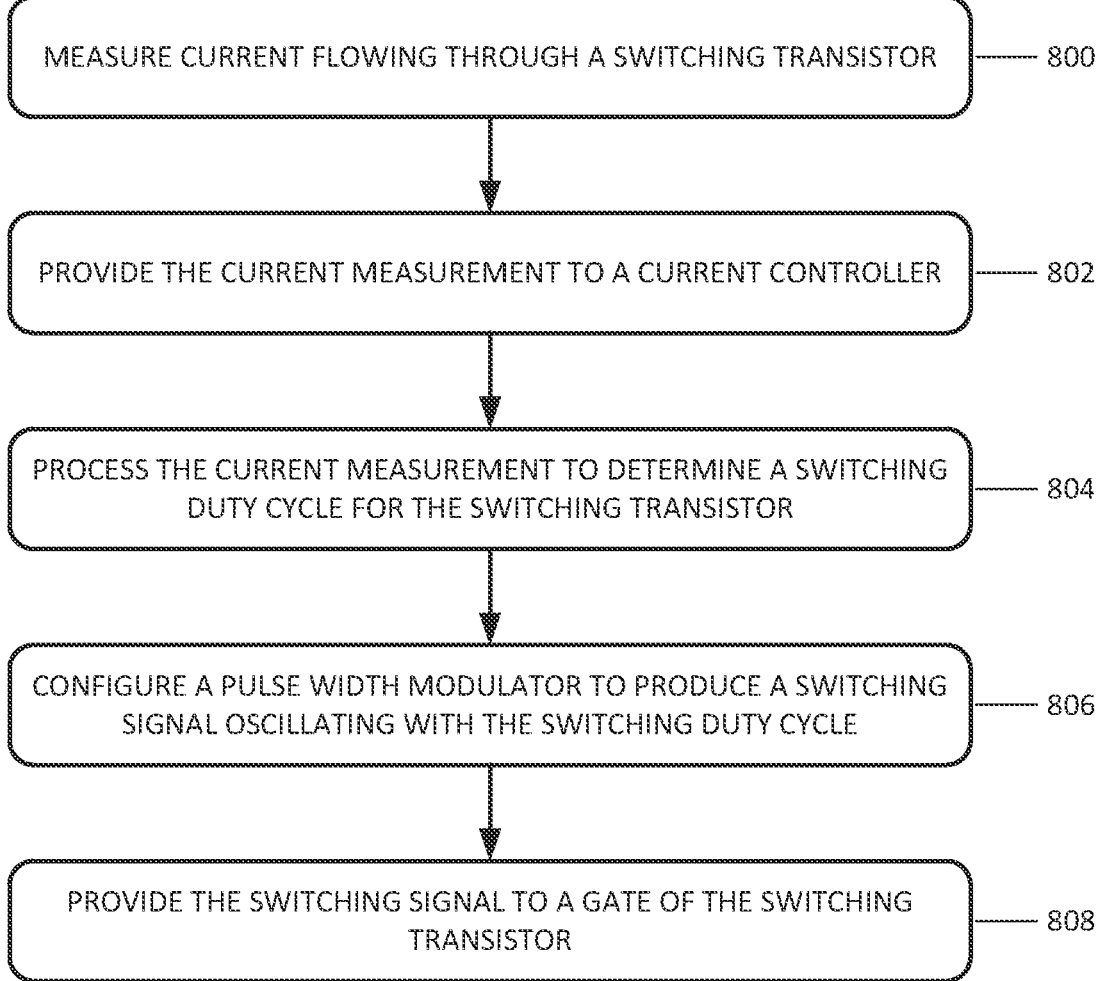

MEASURE CURRENT FLOWING THROUGH A SWITCHING TRANSISTOR ——— 800

PROVIDE THE CURRENT MEASUREMENT TO A CURRENT CONTROLLER ——— 802

PROCESS THE CURRENT MEASUREMENT TO DETERMINE A SWITCHING DUTY CYCLE FOR THE SWITCHING TRANSISTOR ——— 804

CONFIGURE A PULSE WIDTH MODULATOR TO PRODUCE A SWITCHING SIGNAL OSCILLATING WITH THE SWITCHING DUTY CYCLE ——— 806

PROVIDE THE SWITCHING SIGNAL TO A GATE OF THE SWITCHING TRANSISTOR ——— 808

FIG. 8

ACTIVE PRE-CHARGE CIRCUIT

TECHNICAL BACKGROUND

In modern industrial environments, many power machines require large amounts of power of inrush current during the power-up stage. For example, variable speed drives cause a high inrush current when powering up the DC bus link capacitors without proper pre-charge circuit.

Power supplies providing power to these machines must be capable of providing sufficient power during normal operation and start-up. Since start-up current without a proper pre-charge circuit may be so much larger than the current during normal operation, if all of the power supplies were configured to be able to supply start-up power at any time, the power supplies would need to be much larger and more expensive than power supplies capable of providing power during normal operation but not during start-up.

To avoid needing these large power supplies, proper pre-charge circuits are used to charge storage devices at a lower current during the power-up stage. When the machine is turned on, power from the charge storage device is used to start the machine, and the power supply provides power during normal operation.

However, since these charge storage devices are large, during the pre-charge phase if they were connected directly to the power supply, they would have a large inrush current that may damage the power supply. In order to control this inrush current during the pre-charge phase, various methods and devices are used to limit the maximum current.

SUMMARY

In an implementation, an active pre-charge circuit includes a transistor configured to control current pre-charging a charge storage device, and a diode having an anode coupled with a source of the transistor, and a cathode coupled with a drain of the transistor. It also includes a shunt resistor coupled between the source of the transistor and a positive end of the charge storage device, an inductor coupled between the shunt resistor and the positive end of the charge storage device, and a current controller coupled to a gate of the transistor.

The current controller is configured to receive a current measurement indicating an amount of current flowing through the transistor, process the current measurement to determine a switching duty cycle for the transistor, and to provide a signal to the gate of the transistor, the signal oscillating at the switching duty cycle. The circuit also includes a power supply coupled with the source of the transistor and the drain of the transistor and configured to supply power to the current controller.

In another implementation, a power converter includes an AC/DC converter configured to receive power from an AC source, and to supply DC power to a load during normal operation, a charge storage device configured to store power during a pre-charge phase and to supply power to the load during a start-up phase prior to normal operation, and a pre-charge circuit.

The pre-charge circuit is configured to provide power to the charge storage device during the pre-charge phase and to be inactive during normal operation. The pre-charge circuit includes a transistor configured to control current to the charge storage device during the pre-charge phase, and a diode having an anode coupled with a source of the transistor, and a cathode coupled with a drain of the transistor.

The pre-charge circuit also includes a shunt resistor coupled between the source of the transistor and a positive end of the charge storage device, and an inductor coupled between the shunt resistor and the positive end of the charge storage device. The pre-charge circuit further includes a circulating diode having an anode coupled with a negative end of the charge storage device and a cathode coupled with the source of the transistor and the shunt resistor, configured to circulate current through the inductor, the charge storage device, and the shunt resistor when the transistor is turned off, and a current controller coupled to a gate of the transistor.

The current controller is configured to receive a current measurement indicating an amount of current flowing through the transistor, and to process the current measurement to determine a switching duty cycle for the transistor. The current controller is also configured to configure a pulse width modulator within the current controller with the switching duty cycle, and to provide an output of the pulse width modulator to the gate of the transistor. The pre-charge circuit also includes a pre-charge power supply coupled with the source of the transistor and the drain of the transistor and configured to supply power to the current controller.

In another implementation, a method for pre-charging a charge storage device includes measuring a current flowing through a switching transistor, the switching transistor configured to control current charging the charge storage device during a pre-charge phase and providing the current measurement to a current controller.

The current controller processes the current measurement to determine a switching duty cycle for the switching transistor, configures a pulse width modulator to produce a switching signal oscillating at the switching duty cycle, and provides the switching signal to a gate of the switching transistor.

BRIEF DESCRIPTION OF THE DRAWINGS

Many aspects of the disclosure may be better understood with reference to the following drawings. While several implementations are described in connection with these drawings, the disclosure is not limited to the implementations disclosed herein. On the contrary, the intent is to cover all alternatives, modifications, and equivalents.

FIG. 7 illustrates a flowchart of an example method for operating a power converter including an active pre-charge circuit.

FIG. 8 illustrates a flowchart of an example method for operating an active pre-charge circuit.

DETAILED DESCRIPTION

Figure 1:
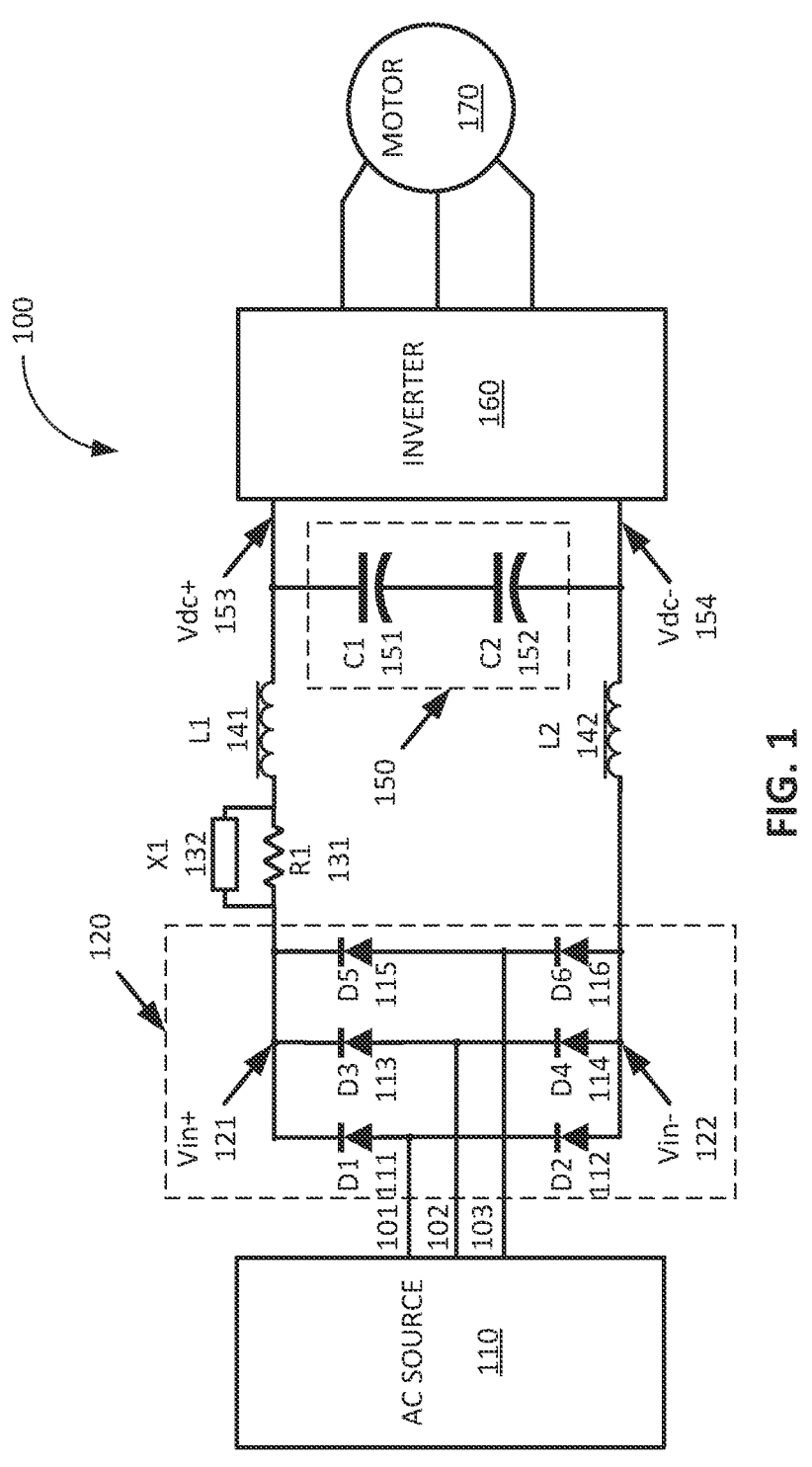
FIG. 1 illustrates an example power converter including a pre-charge circuit.

The following descriptions of various example embodiments and implementations of a system and method for control of inrush current to a charge storage device during start-up. As discussed above, industrial power supplies typically include large charge storage devices that are used to provide power to a machine during start-up, when the machine's power requirements are at their maximum.

These charge storage devices are charged during a pre-charge phase of operation by the power supply or converter. However, since these charge storage devices are large, during the pre-charge phase if they were connected directly to the power converter, they would have a large inrush current that may damage the power converter. In some embodiments, power resistors are provided in series between the power converter and the charge storage device. These power resistors limit the current flowing into the charge storage device and suppress large spikes in inrush current that might damage the power converter. They are typically configured in parallel with a device such as a relay, contactor, power semiconductor, or the like that is used to bypass the power resistor during normal operation.

However, these solutions have drawbacks in that power resistors are large, expensive, and dissipate large amounts of heat during operation. In order to eliminate the need for these power resistors and their associated relays and heat sinks, a pre-charge system including a switching transistor is used to gate current into the chare storage device.

By controlling the switching transistor to regulate current flowing into the charge storage device, pre-charge current remains below a desired maximum pre-charge current value. The switching transistor is operated in switching mode (not linear mode) and so does not dissipate large amounts of power itself. It is controlled by a current controller which provides a switching signal to the gate of the switching transistor.

This switching signal is configured to have a duty cycle such that the switching transistor is on for short intervals of time during the pre-charge phase. The pre-charge circuit is in a buck converter configuration, including a recirculating diode configured to circulate current for the inductors when the switching transistor is off. The pre-charge system is configured such that once the pre-charge phase is complete it automatically shuts off and is transparent to the power converter during normal operation.

This solution for pre-charging a charge storage device provides a technical advantage by controlling the pre-charge current to a desired level while eliminating inrush current spikes without the use of large and expensive components, such as power resistors, relays, and heatsinks. This provides for the design of smaller, more efficient power supplies for industrial machines. This solution also reduces potential failures throughout the system by greatly reducing the inrush current and the stress of various components within the system.

FIG. 1 illustrates an example power converter 100 including a pre-charge circuit. As discussed above, power supplies in industrial automation environments often include charge storage devices 150 (capacitors C1 151 and C2 152) which are configured to provide start-up current to machines such as motor 170 since they require such large currents while starting up. In this example, charge storage device 150 provides start-up power to motor 170 through inverter 160.

Power converter 100 includes AC source 110 with three phase outputs 101, 102, and 103. AC/DC converter 120 comprises six diodes, with diodes D1 111 and D2 112 coupled with the first phase 101, diodes D3 113 and D4 114 coupled with the second phase 102, and diodes D5 115 and D6 116 coupled with the third phase 103. AC/DC converter 120 provides voltages Vin+ 121 and Vin− 122 to charge storage device 150 through inductors L1 141 and L2 142. Output voltages Vdc+ 153 and Vdc− 154 are then provided to motor (or another industrial machine) 170 through inverter 160. Inductors L1 141 and L2 142 act as low frequency filters to remove noise from output voltages Vdc+ 153 and Vdc− 154.

Charge storage device 150 is charged by AC source 110 which powers AC/DC converter 120 which in turn charges charge storage device 150 through inductors L1 141 and L2 142. However, if AC/DC converter 120 were to be directly coupled to inductors L1 141 and L2 142, when AC source 110 is activated, a huge inrush of current would initially flow through AC/DC converter 120 into charge storage device 150.

This large current would require the diodes within AC/DC converter 120, (diodes D1 111-D6 116) to be rated for the maximum inrush current. Such diodes are large and expensive. In order to limit this inrush current, a power resistor R1 131 is placed in series between AC/DC converter 120 and charge storage device 150. Power resistor R1 131 requires a high current surge capability, and is also large and expensive. Further, during pre-charge, power resistor R1 131 radiates large amounts of heat and may require an additional heatsink. Device X1 132 is used to by-pass power resistor R1 131 during normal operation and comprises a device such as a relay, contactor, power semiconductor, or the like.

Figure 2:
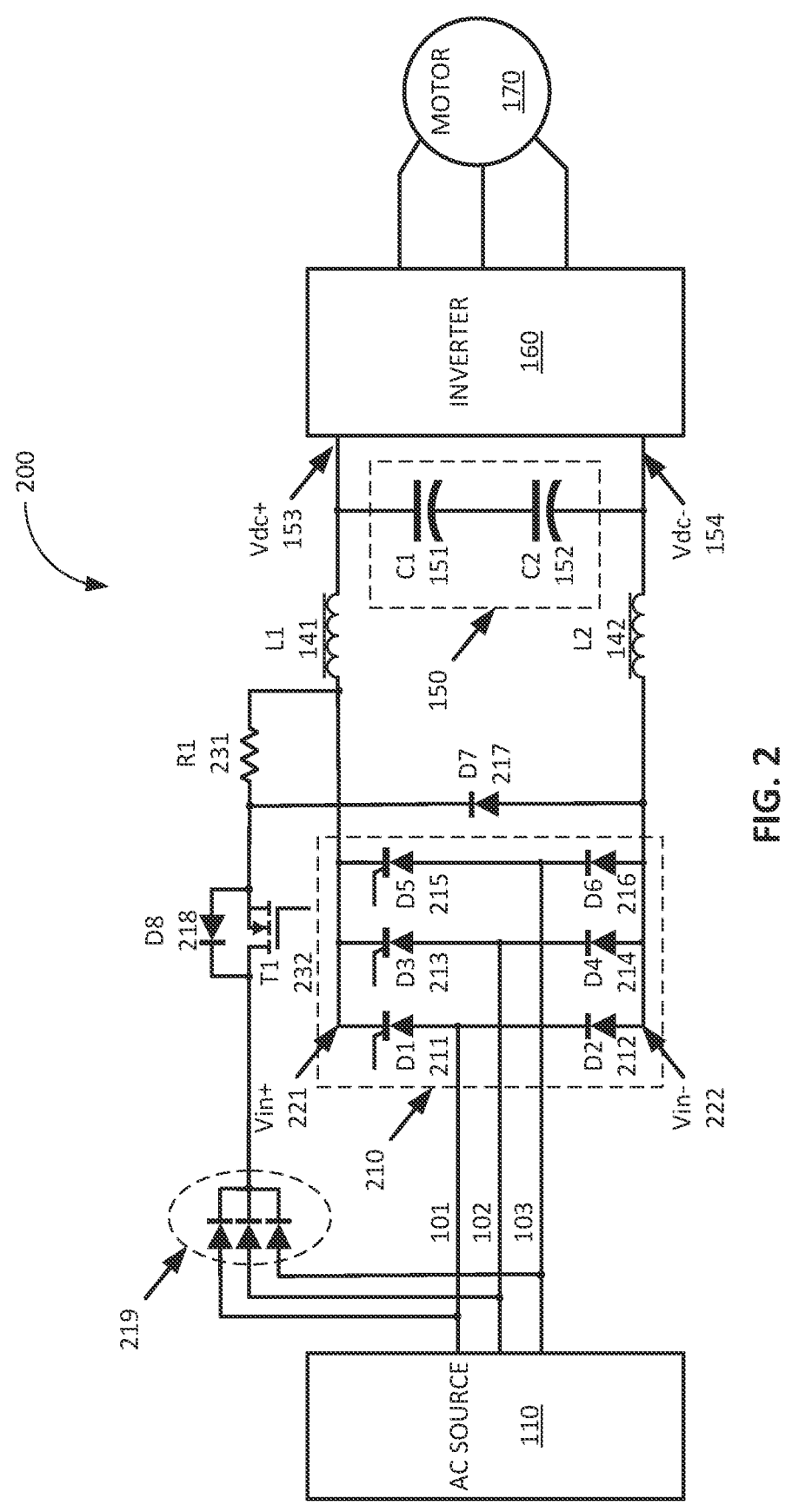
FIG. 2 illustrates an example power converter including an active pre-charge circuit.

FIG. 2 illustrates an example power converter 200 including an active pre-charge circuit. In this example, a switching transistor T1 232 in parallel with diode D8 218 is used to control the pre-charge current flowing into charge storage device 150. Switching transistor T1 232 is operated in switching mode (not linear mode) and consumes little power during operation. In this example embodiment, switching transistor T1 232 is a power MOSFET, while in other embodiments other types of transistors may be used.

In this example, power converter 200 includes AC source 110 with three phase outputs 101, 102, and 103. AC/DC converter 210 comprises three diodes and three silicon-controlled rectifiers (SCRs), with SCR D1 211 and diode D2 212 coupled with the first phase 101, SCR D3 213 and diode D4 214 coupled with the second phase 102, and SCR D5 215 and diode D6 216 coupled with the third phase 103. AC/DC converter 210 provides voltages Vin+ 221 and Vin− 222 to charge storage device 150 through inductors L1 141 and L2 142. Output voltages Vdc+ 153 and Vdc− 154 is then provided to motor (or another industrial machine) 170 through inverter 160.

Power converter 200 also includes a simple rectifier 219 configured to provide current to charge storage device 150 through switching transistor T1 232 during a pre-charge phase of operation. The pre-charge circuit also includes a shunt resistor R1 231 and a circulating diode D7 217. Together switching transistor T1 232, diode D8 218, shunt resistor R1 231, circulating diode D7 217, inductors L1 141 and L2 142, and charge storage device 150 comprise a buck converter configured to operate in a constant current mode during the pre-charge phase.

Diode D8 218 has an anode coupled with a source of switching transistor T1 232, and a cathode coupled with a drain of switching transistor T1 232. Shunt resistor R1 231 is coupled between the source of switching transistor T1 232 and the positive end (Vdc+ 153) of charge storage device 150 through inductor L1 141.

Circulating diode D7 217 has an anode coupled with a negative end (Vdc− 154) of charge storage device 150 through inductor L2 142, and a cathode coupled with the source of switching transistor T1 232 and shunt resistor R1

231. Circulating diode D7 217 is configured to circulate current through the inductors L1 141 and L2 142, charge storage device 150, and shunt resistor R1 231 when switching transistor T1 232 is turned off.

Figure 3:
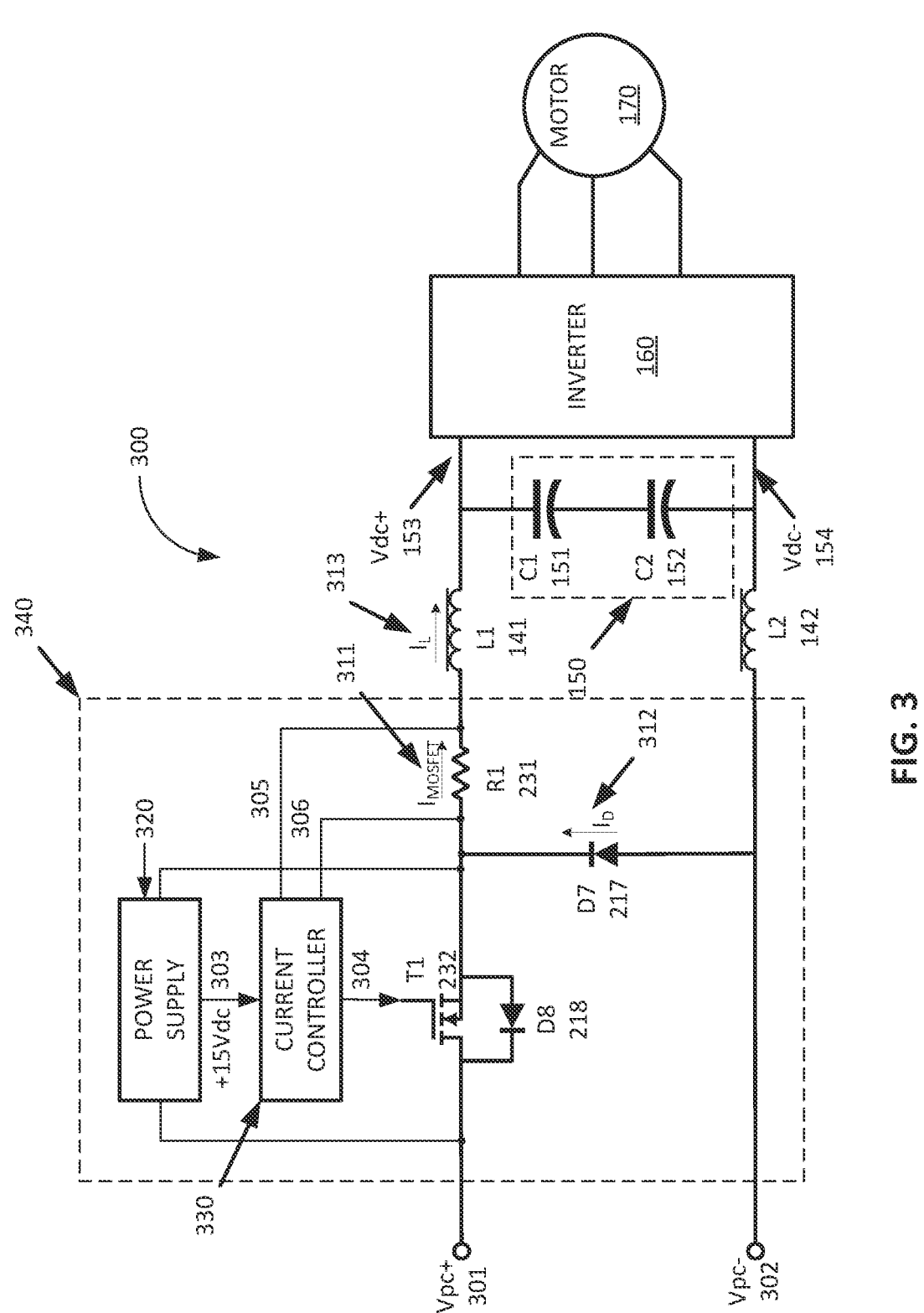
FIG. 3 illustrates an active pre-charge system including the active pre-charge circuit of FIG. 2.

FIG. 3 illustrates an active pre-charge system 340 including the pre-charge circuit of FIG. 2. In this example embodiment, pre-charge system 340 receives voltages Vpc+ 301 and Vpc− 302 from an AC source 110 (through a simple rectifier 219) and an AC/DC converter 210 (such as illustrated in FIG. 2). Pre-charge system 340 is configured to supply current to charge storage device 150 (comprising capacitors C1 151 and C2 152) through inductors L1 141 and L2 142 during a pre-charge phase. Charge storage device 150 has a positive end Vdc+ 153 and a negative end Vdc− 154. Once the pre-charge phase is complete, charge storage device 150 supplies power to motor 170 through inverter 160 during a start-up phase. In this example embodiment, charging currents are dramatically reduced to about five to ten Amps, while the charging time takes about one to two seconds.

In this example embodiment, pre-charge system 340 includes power supply 320, current controller 330, switching transistor T1 232, diode D8 218, circulating diode D7 217, and shunt resistor R1 231. Power supply 320 is powered by a voltage difference between the source of transistor T1 232 and the drain of transistor T1 232. During pre-charge this voltage difference is sufficient to operate power supply 320. Once charge storage device 150 is sufficiently charged, the voltage difference between the drain of transistor T1 232 and the source of transistor T1 232 is reduced below the voltage necessary to operate power supply 320 and power supply 320 ceases operation. Once power supply 320 is off, current controller 330 no longer receives its input voltage from power supply 320 over link 303, and current controller 330 also ceases operation. Once current controller 330 is off, link 304 is low and transistor T1 232 is off, thus shutting off the entire pre-charge circuit. This automatic start and stop of the pre-charge circuit during the pre-charge phase eliminates the need for additional circuitry to turn the pre-charge circuit on and off and reduces the complexity of the system.

In some embodiments, power supply 320 is a high voltage linear power supply configured to provide 15 volts to current controller 330 through link 303. Current controller 330 is configured to provide a signal 304 to the gate of switching transistor T1 232 in order to control current charging charge storage device 150. This signal 304 is a high frequency signal (some example embodiments have frequencies between 50 kHz and 200 kHz) having a specific duty cycle such that switching transistor T1 232 modulates the current flowing to charge storage device 150 and keeps the maximum pre-charge current below a desired maximum pre-charge current value.

At start-up of the system, charge storage device 150 contains no (or a small amount of) charge and Vdc+ 153 is at essentially the same voltage as Vdc− 154 and Vpc− 302 (or ground). As soon as the AC source starts up, Vpc+ 301 quickly rises and power supply 320 begins operation powered by the voltage difference between Vpc+ 301 and Vdc+ 153.

Power supply 320 quickly begins providing power (+15 Vdc 303) to current controller 330 and current controller 330 begins providing a switching signal 304 to the gate of switching transistor T1 232. In this example embodiment, current controller 330 receives an indication of the current flowing through switching transistor T1 232 by measuring the voltage across shunt resistor R1 231 which is provided to current controller 330 through links 305 and 306. Other embodiments may use other methods of measuring the current through switching transistor T1 232.

Current controller 330 processes this current measurement in order to determine a switching duty cycle for switching transistor T1 232 in order to provide a controlled supply of pre-charge current to charge storage device 150. In some embodiments, current controller 330 includes a pulse width modulator which is configured to provide signal 304 to the gate of switching transistor T1 232 with the calculated switching duty cycle determined by processing circuitry within current controller 330. Current controller 330 is illustrated in detail in FIG. 6 and further described below.

Current flowing through shunt resistor R1 231 indicates the current flowing through switching transistor T1 232 and is indicated as $I_{MOSFET}$ 311. Current flowing through circulating diode D7 is indicated as ID 312. Current flowing through inductor L1 141 is indicated as $I_L$ 313. Voltages Vpc+ 301 and Vdc+ 153, along with currents $I_{MOSFET}$ 311, $I_L$ 313, and $I_D$ 312 are illustrated in FIG. 4 and described in detail below.

Figure 5:
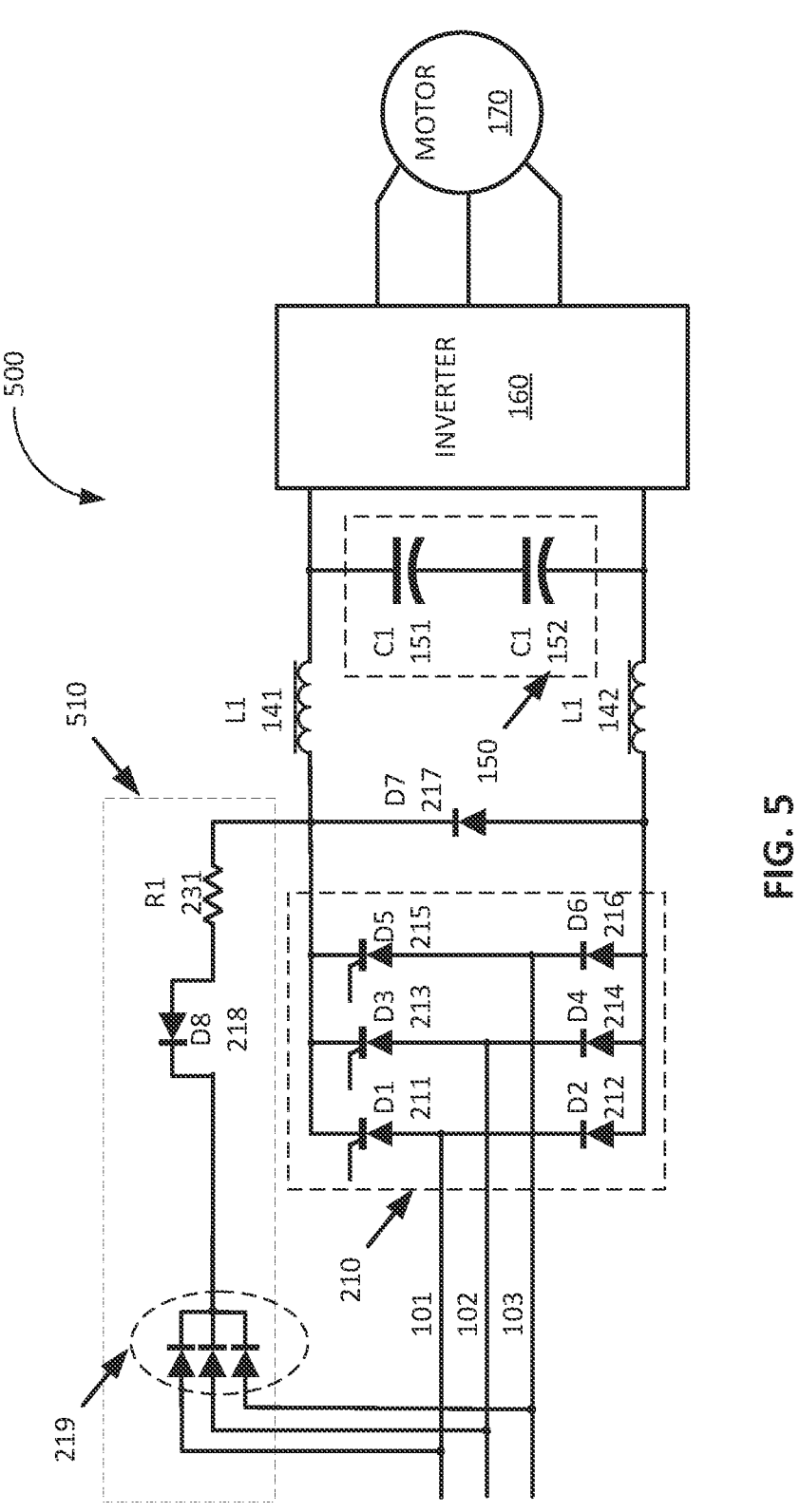
FIG. 5 illustrates the active pre-charge circuit of FIGS. 2 and 3 at the conclusion of a pre-charge phase of operation.

Signal 304 is provided to switching transistor T1 232 during the pre-charge phase of operation and then, when charge storage device 150 is fully charged, there is no longer a sufficient voltage differential between Vpc+ 301 and Vdc+ 153 for power supply 320 to operate. Power supply 320 then shuts down and stops supplying power to current controller 330 through link 303. This causes current controller 330 to also shut down and stop providing signal 304 to the gate of switching transistor T1 232. Switching transistor T1 232 is then off or open, and the entire pre-charge system 340 is off and effectively transparent to the overall system during normal operation as illustrated in FIG. 5.

Figure 4:
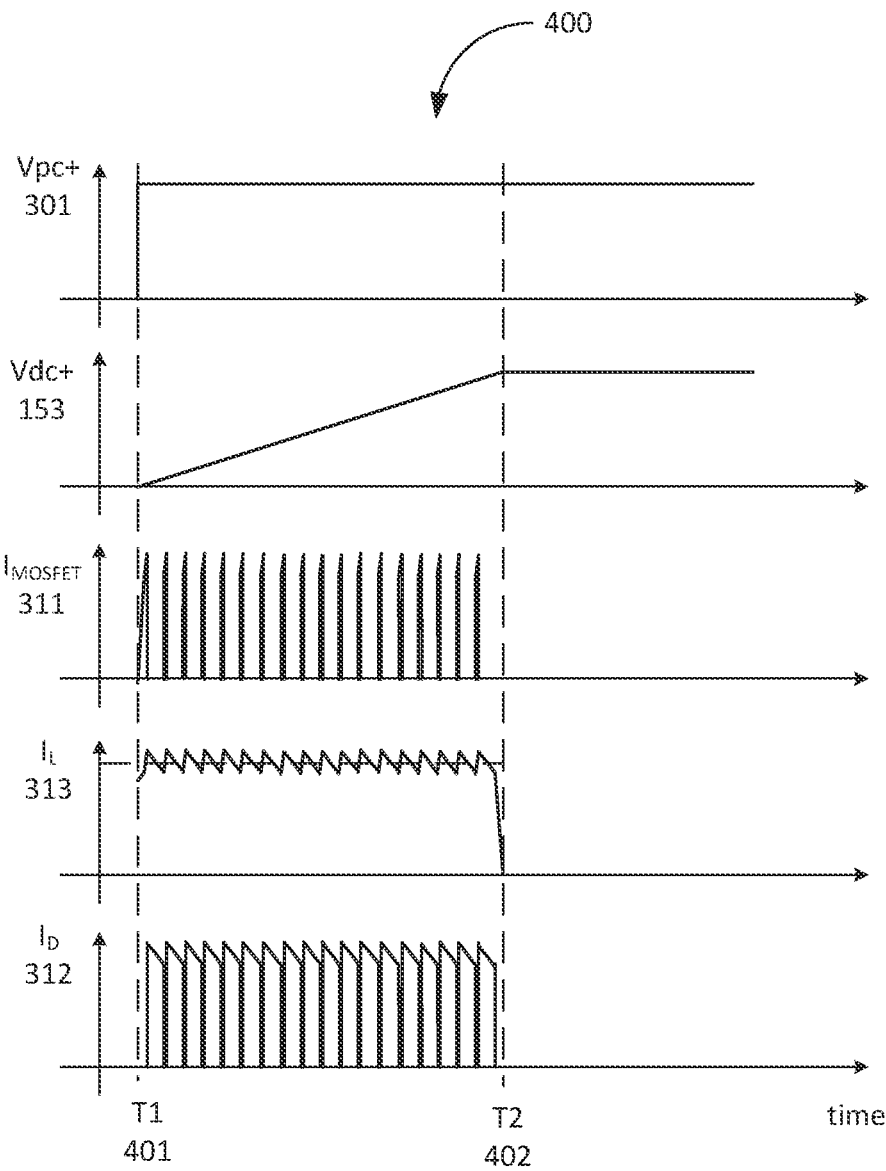
FIG. 4 illustrates various signals within the active pre-charge circuit of FIG. 2 during a pre-charge phase of operation.

FIG. 4 illustrates various signals within the active pre-charge circuit of FIG. 2 during a pre-charge phase of operation. Voltages Vpc+ 301 and Vdc+ 153, along with currents $I_{MOSFET}$ 311, $I_L$ 313, and $I_D$ 312 are illustrated as they vary with time during the pre-charge phase and during normal operation.

At time T1 401 the system is activated and the pre-charge phase begins. Vpc+ 301 (the output of AC source 110 through rectifier 219) very quickly rises allowing power supply 320 and the pre-charge system 340 to begin operation. Vdc+ 153 slowly rises as charge storage device 150 slowly charges during the pre-charge phase (between time T1 401 and T2 402).

$I_{MOSFET}$ 311 oscillates as switching transistor T1 232 is turned on and off by current controller 330, while $I_L$ 313 maintains a moderately steady pre-charge current into charge storage device 150, and $I_D$ 312 oscillates as switching transistor T1 232 is turned on and off by current controller 330. Note that $I_{MOSFET}$ 311 is high when switching transistor T1 232 is on. In contrast, the circulating current through circulating diode D7 217 is high when switching transistor T1 232 is off. The combination of these two currents through inductor L1 141 provides the relatively smooth pre-charging current shown by $I_L$ 313.

FIG. 5 illustrates the active pre-charge circuit 510 of FIGS. 2 and 3 at the conclusion of a pre-charge phase of operation. In this example embodiment, once the pre-charge phase is complete, and charge storage device 150 is fully charged (time T2 402 in FIG. 4), all of the active devices within pre-charge system 340 (power supply 320, current controller 330 and switching transistor T1 232) are turned off and effectively transparent to the system. All that remains of pre-charge system 340 are the rectifier 219, diode D8 218, shunt resistor R1 231 and circulating diode D7 217. Since there is no longer any current flowing through these devices, they have no effect on the overall system.

Figure 6:
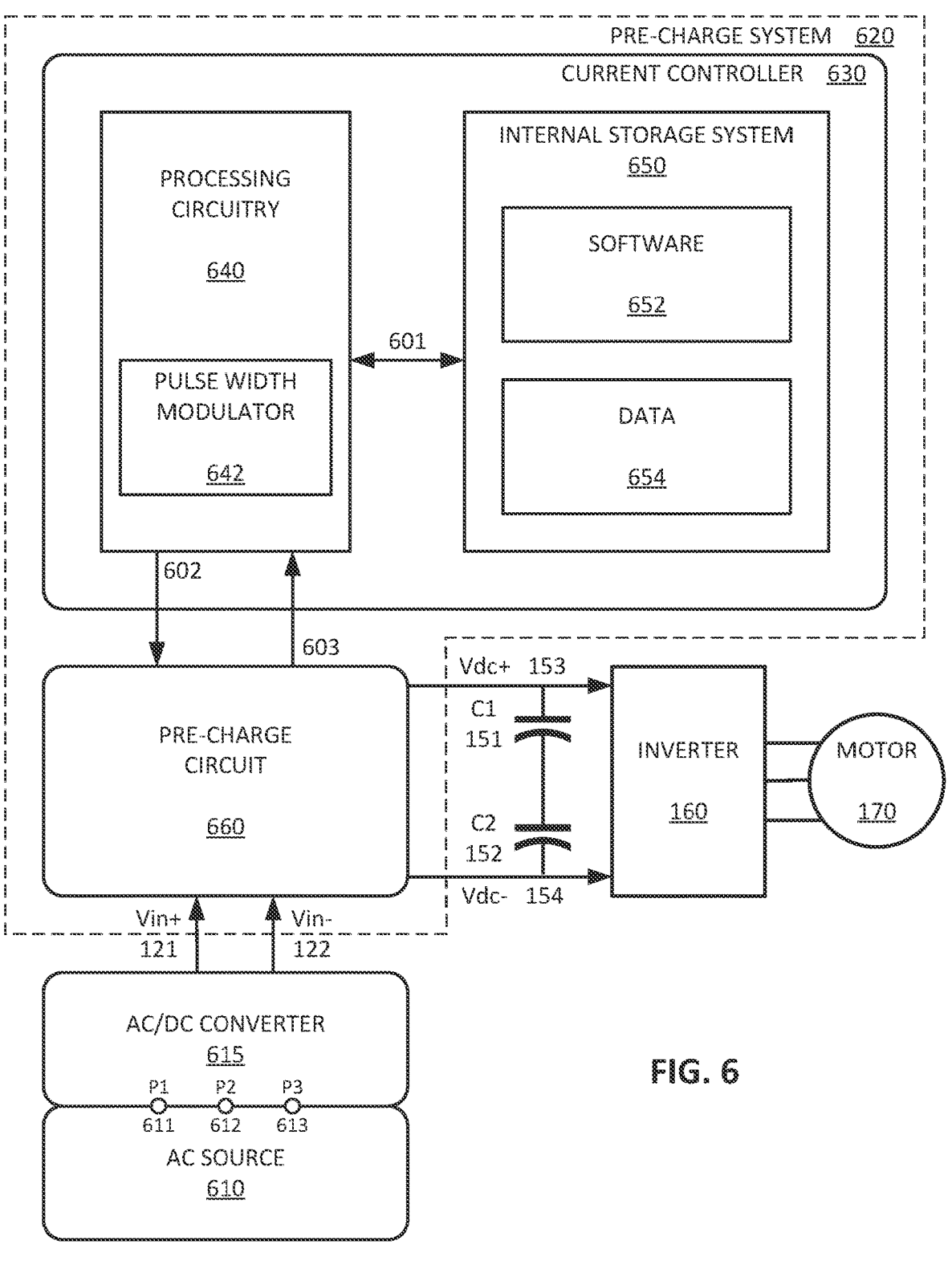
FIG. 6 illustrates an example block diagram of a power converter including an active pre-charge circuit in an industrial automation environment.

FIG. 6 illustrates an example block diagram of a power converter including an active pre-charge circuit 660 providing power to a motor 170 in an industrial automation environment. In this example embodiment, a power converter including AC source 610, AC/DC converter 615, and pre-charge system 620 is illustrated. Pre-charge system 620 includes current controller 630 and pre-charge circuit 660. Pre-charge circuit 660 is similar to those illustrated in FIGS. 2-5 and described in detail above.

In this example embodiment, AC/DC converter 615 receives three phases of power (P1 611, P2 612, and P3 613) from AC source 610. AC/DC converter 615 supplies power (Vin+ 121 and Vin− 122) to pre-charge circuit 660 which in turn supplies power (Vdc+ 153 and Vdc− 154) to motor 170 through inverter 160. In this example, a charge storage device includes capacitors C1 151 and C2 152. This charge storage device is used to supply power to motor 170 during start-up since large currents are typically required to start-up motor 170.

Pre-charge circuit 660 is configured to pre-charge capacitors C1 151 and C2 152 during a pre-charge phase while limiting the charge current and preventing large inrush currents. Pre-charge circuit 660 is illustrated in FIGS. 2-5 and described in detail above. Pre-charge circuit 660 is controlled by current controller 630, similar to current controller 330 illustrated in FIG. 3.

In this example embodiment, current controller 630 includes processing circuitry 640 and internal storage system 650. Processing circuitry 640 includes pulse width modulator 642, and is coupled with internal storage system 650 through link 601. Processing circuitry 640 is also coupled with pre-charge circuit 660 through links 602 and 603. Internal storage system 650 includes software 652 and data 654.

Processing circuitry 640 is configured to provide a signal to the gate of the transistor T1 232 within pre-charge circuit 660 through link 602, as described above. Processing circuitry 640 is also configured to receive a current measurement signal from pre-charge circuit 660 through link 603. In example embodiments, this current measurement signal is a voltage across the shunt resistor within pre-charge circuit 660, as described above.

Processing circuitry 640 comprises electronic circuitry configured to direct current controller 630 to control pre-charge circuit 660 as to limit current pre-charging the charge storage device by controlling the transistor T1 232 within pre-charge 660 with a signal having a switching duty cycle based at least in part of the current measurement.

Processing circuitry 640 may comprise microprocessors and other circuitry that retrieves and executes software 652. Examples of processing circuitry 640 include general purpose central processing units, application specific processors, and logic devices, as well as any other type of processing device, combinations, or variations thereof. Processing circuitry 640 may be implemented within a single processing device but may also be distributed across multiple processing devices or sub-systems that cooperate in executing program instructions.

Internal storage system 650 may comprise any non-transitory computer readable storage media capable of storing software 652 that is executable by processing circuitry 640. Internal storage system 650 may also include various data structures 654 which comprise one or more registers, databases, tables, lists, or other data structures. Storage system 650 may include volatile and nonvolatile, removable and non-removable media implemented in any method or technology for storage of information, such as computer readable instructions, data structures, program circuits, or other data.

Storage system 650 may be implemented as a single storage device but may also be implemented across multiple storage devices or sub-systems co-located or distributed relative to each other. Storage system 650 may comprise additional elements, such as a controller, capable of communicating with processing circuitry 640. Examples of storage media include random access memory, read only memory, magnetic disks, optical disks, flash memory, virtual memory and non-virtual memory, magnetic cassettes, magnetic tape, magnetic disk storage or other magnetic storage devices, or any other medium which may be used to store the desired information and that may be accessed by an instruction execution system, as well as any combination or variation thereof.

Software 652 may be implemented in program instructions and among other functions may, when executed by current controller 630 in general, or processing circuitry 640 in particular, direct current controller 630, or processing circuitry 640, to operate as described herein to control pre-charge circuit 660 in order to moderate pre-charge current to the charge storage device. Software 652 may include additional processes, programs, or components, such as operating system software, database software, or application software. Software 652 may also comprise firmware or some other form of machine-readable processing instructions executable by elements of processing circuitry 640.

In general, software 652 may, when loaded into processing circuitry 640 and executed, transform processing circuitry 640 overall from a general-purpose computing system into a special-purpose computing system customized to operate as described herein for a current controller 630 configured to control pre-charge circuit 660 in order to moderate pre-charge current to the charge storage device, among other operations. Encoding software 652 on internal storage system 650 may transform the physical structure of internal storage system 650. The specific transformation of the physical structure may depend on various factors in different implementations of this description. Examples of such factors may include, but are not limited to the technology used to implement the storage media of internal storage system 650 and whether the computer-storage media are characterized as primary or secondary storage.

For example, if the computer-storage media are implemented as semiconductor-based memory, software 652 may transform the physical state of the semiconductor memory when the program is encoded therein. For example, software 652 may transform the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate this discussion.

FIG. 7 illustrates a flowchart of an example method for operating a power supply including an active pre-charge circuit. In this example embodiment, a power supply 320 is turned on in order to supply voltage to current controller 330, (operation 700). Current controller 330 then begins controlling switching transistor T1 232 within pre-charge circuit 340 in order to supply a constant charging current to charge storage device 150 (capacitors C1 151 and C2 152), (operation 702).

When charge storage device 150 (capacitors C1 151 and C2 152) is fully charged, power supply 320 no longer supplies a voltage to current controller 330 and switching transistor T1 232 within pre-charge circuit 340 is off, (operation 704). After the pre-charge phase in operation 702 is completed at operation 704, silicon-controlled rectifiers D1 211, D3 213, and D5 215 within AC/DC converter 210 begin normal operation, (operation 706), and pre-charge circuit 340 is open circuited, (operation 708).

FIG. 8 illustrates a flowchart of an example method for operating an active pre-charge circuit. In this example embodiment, pre-charge circuit 340 measures current flowing through switching transistor T1 232, (operation 800). In some embodiments, this measurement is performed by measuring a voltage across shunt resistor R1 231. This current measurement is then provided to current controller 330, (operation 802).

Current controller 330 processes the current measurement to determine a switching duty cycle for the switching transistor T1 232, (operation 804). Current controller 330 configures a pulse width modulator 642 in order to generate a switching signal 304 having the switching duty cycle as determined in operation 804, (operation 806). Current controller 330 then provides the switching signal 304 to a gate of the switching transistor, (operation 808).

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above may be combined in various ways to form multiple embodiments. As a result, the invention is not limited to the specific embodiments described above, but only by the claims and their equivalents.

A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

A circuit or device that is described herein as including certain components may instead be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be coupled to at least some of the passive elements and/or the sources to form the described structure either at a time of manufacture or after a time of manufacture, for example, by an end-user and/or a third-party.

While certain components may be described herein as being of a particular process technology, these components may be exchanged for components of other process technologies. Circuits described herein are reconfigurable to include the replaced components to provide functionality at least partially similar to functionality available prior to the component replacement. Components shown as relays, unless otherwise stated, are generally representative of any one or more elements configured to operate as a relay or switch. Such relay components include relays, contactors, and similar components.

Components shown as resistors, unless otherwise stated, are generally representative of any one or more elements coupled in series and/or parallel to provide an amount of impedance represented by the shown resistor. For example, a resistor or capacitor shown and described herein as a single component may instead be multiple resistors or capacitors, respectively, coupled in parallel between the same terminals. For example, a resistor or capacitor shown and described herein as a single component may instead be multiple resistors or capacitors, respectively, coupled in series between the same two terminals as the single resistor or capacitor.

Uses of the phrase "ground voltage potential" in the foregoing description include a chassis ground, an Earth ground, a floating ground, a virtual ground, a digital ground, a common ground, and/or any other form of ground connection applicable to, or suitable for, the teachings of this description. In this description, unless otherwise stated, "about," "approximately" or "substantially" preceding a parameter means being within +/−10 percent of that parameter. Modifications are possible in the described examples, and other examples are possible within the scope of the claims.

What is claimed is:

1. An active pre-charge circuit, comprising:
   a transistor configured to control current pre-charging a charge storage device;
   a diode having an anode coupled with a source of the transistor, and a cathode coupled with a drain of the transistor;
   a shunt resistor coupled between the source of the transistor and a positive end of the charge storage device;
   an inductor coupled between the shunt resistor and the positive end of the charge storage device;
   a current controller coupled to a gate of the transistor and configured to:
      receive a current measurement indicating an amount of current flowing through the transistor;
      process the current measurement to determine a switching duty cycle for the transistor;
      provide a signal to the gate of the transistor, the signal oscillating at the switching duty cycle; and
   a power supply coupled with the source of the transistor and the drain of the transistor and configured to supply power to the current controller, wherein the power supply is powered by a voltage difference between the source of the transistor and the drain of the transistor such that the current controller is off when the charge storage device is charged.

2. The active pre-charge circuit of claim 1, wherein the current controller further comprises a pulse width modulator configured to provide the signal to the gate of the transistor, the signal oscillating at the switching duty cycle.

3. The active pre-charge circuit of claim 1, further comprising:
   a circulating diode having an anode coupled with a negative end of the charge storage device and a cathode coupled with the source of the transistor and the shunt resistor, configured to circulate current through the inductor, the charge storage device, and the shunt resistor when the transistor is turned off.

4. The active pre-charge circuit of claim 3, wherein the circuit operates as a buck converter.

5. The active pre-charge circuit of claim 1, wherein the transistor is configured to control current supplied by an AC source through a rectifier to the drain of the transistor to the charge storage device through the transistor, shunt resistor, and inductor in order to pre-charge the charge storage device prior to start-up of a load coupled with the charge storage device.

6. The active pre-charge circuit of claim 1, wherein the power supply is coupled to an AC source via a rectifier.

7. The active pre-charge circuit of claim 1, wherein during normal operation, after pre-charge of the charge storage device, the voltage difference between the source of the transistor and the drain of the transistor is too small to operate the pre-charge power supply, the pre-charge power supply is off, the transistor is open, and the pre-charge circuit is off.

8. The active pre-charge circuit of claim 1, wherein the current controller is configured to determine a switching frequency for the transistor based at least in part on a maximum pre-charge current value.

9. The active pre-charge circuit of claim 1, wherein during normal operation, a load is coupled across the positive end of the charge storage device and the negative end of the charge storage device, and power is supplied to the load from an AC source through an AC/DC converter.

10. The active pre-charge circuit of claim 1, wherein the current measurement is based on a voltage across the shunt resistor.

11. The active pre-charge circuit of claim 1, wherein the charge storage device comprises a capacitor.

12. A power converter, comprising:

an AC/DC converter configured to receive power from an AC source, and to supply DC power to a load during normal operation;

a charge storage device configured to store power during a pre-charge phase and to supply power to the load during a start-up phase prior to normal operation; and an active pre-charge circuit configured to provide power to the charge storage device during the pre-charge phase and to be inactive during normal operation, the pre-charge circuit comprising:

a transistor configured to control current to the charge storage device during the pre-charge phase;

a diode having an anode coupled with a source of the transistor, and a cathode coupled with a drain of the transistor;

a shunt resistor coupled between the source of the transistor and a positive end of the charge storage device;

an inductor coupled between the shunt resistor and the positive end of the charge storage device;

a circulating diode having an anode coupled with a negative end of the charge storage device and a cathode coupled with the source of the transistor and the shunt resistor, configured to circulate current through the inductor, the charge storage device, and the shunt resistor when the transistor is turned off;

a current controller coupled to a gate of the transistor and configured to:

receive a current measurement indicating an amount of current flowing through the transistor;

process the current measurement to determine a switching duty cycle for the transistor;

configure a pulse width modulator within the current controller with the switching duty cycle; and provide an output of the pulse width modulator to the gate of the transistor; and a pre-charge power supply coupled with the source of the transistor and the drain of the transistor and configured to supply power to the current controller during the pre-charge phase, wherein the power supply is powered by a voltage difference between the source of the transistor and the drain of the transistor such that the current controller is off when the charge storage device is charged.

13. The power converter of claim 12, wherein the active pre-charge circuit operates as a buck converter.

14. The power converter of claim 12, wherein the active pre-charge circuit is configured to control current supplied by an AC source through a rectifier to the charge storage device through the pre-charge circuit in order to pre-charge the charge storage device prior to start-up of a load coupled with the charge storage device.

15. The power converter of claim 12, wherein the pre-charge power supply is coupled to an AC source via a rectifier.

16. The power converter of claim 12, wherein during normal operation, after pre-charge of the charge storage device, the voltage difference between the source of the transistor and the drain of the transistor is too small to operate the pre-charge power supply so the pre-charge power supply is off, the transistor is open, and the pre-charge circuit is off.

17. The power converter of claim 12, wherein the current controller is configured to determine a switching frequency for the transistor based at least in part on a maximum pre-charge current value.

18. The power converter of claim 12, wherein the current measurement is based on a voltage across the shunt resistor.

19. The power converter of claim 12, wherein the charge storage device comprises a capacitor.

20. A method for pre-charging a charge storage device, the method comprising:

measuring a current flowing through a switching transistor, the switching transistor configured to control current charging the charge storage device during a pre-charge phase;

providing the current measurement to a current controller;

the current controller processing the current measurement to determine a switching duty cycle for the switching transistor;

the current controller configuring a pulse width modulator to produce a switching signal oscillating at the switching duty cycle;

the current controller providing the switching signal to a gate of the switching transistor; and supplying power to the current controller with a power supply during the pre-charge phase, wherein the power supply is powered by a voltage difference between a source of the switching transistor and a drain of the switching transistor such that the current controller is off when the charge storage device is charged.

\*    \*    \*    \*    \*